US006831120B1

(12) United States Patent
Zobel et al.

(10) Patent No.: US 6,831,120 B1
(45) Date of Patent: Dec. 14, 2004

(54) FLAME-RESISTANT POLYCARBONATE BLENDS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 351 days.

(21) Appl. No.: 10/069,746

(22) PCT Filed: Aug. 22, 2000

(86) PCT No.: PCT/EP00/08160

§ 371 (c)(1),
(2), (4) Date: Feb. 27, 2002

(87) PCT Pub. No.: WO01/18117

PCT Pub. Date: Mar. 15, 2001

(30) Foreign Application Priority Data

Sep. 2, 1999 (DE) .......................... 199 41 824

(51) Int. Cl.$^7$ .................. C08K 5/5317; C08K 3/10; C08K 3/22; C08K 3/34; C08L 51/04
(52) U.S. Cl. .................. 524/124; 524/117; 524/119; 524/130; 524/404; 524/418; 524/430; 524/431; 524/463; 524/493; 524/504
(58) Field of Search .................. 524/117, 119, 524/128, 404, 418, 430, 431, 463, 493, 504, 124

(56) References Cited

U.S. PATENT DOCUMENTS

| 3,505,431 A | 4/1970 | Birum ................... 260/932 |
| 3,711,577 A | 1/1973 | Maier ................... 260/932 |
| 4,054,544 A | 10/1977 | Albright ................ 260/2.5 AJ |
| 4,073,767 A | 2/1978 | Birum .................. 260/45.8 R |
| 4,397,750 A | 8/1983 | Chibnik ................. 252/51.5 A |
| 5,061,745 A | 10/1991 | Wittmann et al. .......... 524/139 |
| 5,204,394 A | 4/1993 | Gosen et al. ............. 524/125 |
| 5,276,066 A | 1/1994 | Paulik et al. ............. 521/108 |
| 5,552,465 A | 9/1996 | Witmann et al. .......... 524/139 |
| 5,672,645 A | 9/1997 | Eckel et al. ............. 524/127 |
| 5,844,028 A | 12/1998 | Paulik .................. 524/117 |
| RE36,902 E | 10/2000 | Eckel et al. ............. 524/217 |

FOREIGN PATENT DOCUMENTS

| CA | 2318430 | 7/1999 |
| DE | 19 734 661 | 2/1999 |
| FR | 1371139 | 8/1964 |
| GB | 2 330 583 | 4/1999 |

Primary Examiner—Tae H. Yoon
(74) Attorney, Agent, or Firm—Joseph C. Gil; Aron Preis

(57) ABSTRACT

The present invention relates to polycarbonate blends containing phosphonate amine and inorganic nanoparticles, which have improved flame proofing and improved mechanical properties such as low-temperature impact strength, elongation at break, weld line strength and stress cracking resistance as well as an improved yellowness index.

24 Claims, No Drawings

FLAME-RESISTANT POLYCARBONATE BLENDS

The present invention relates to polycarbonate/ABS blends containing phosphonate amines and inorganic nanoparticles, which have improved flame-proofing and improved mechanical properties such as low-temperature notched impact strength, good elongation at break, weld line strength and stress cracking resistance as well as an improved yellowness index.

U.S. Pat. No. 4,073,767 and U.S. Pat. No. 5,844,028 describe cyclic phosphorus compounds which include phosphorinane rings as suitable flame retardants for polyurethanes, polyesters, polycarbonates and polyamides. U.S. Pat. No. 4,397,750 describes certain cyclic phosphonate esters as efficient flame retardants for polypropylene and other polyolefins. U.S. Pat. No. 5,276,066 and U.S. Pat. No. 5,844,028 describe certain (1,3,2-dioxaphosphorinanemethan)amines which are suitable flame retardants for polyurethanes, polyesters, styrene polymers, polyvinyl chloride, polyvinyl acetate and polycarbonate.

U.S. Pat. No. 3,505,431, FR-P 1 371 139, U.S. Pat. No. 3,711,577, U.S. Pat. No. 4,054,544 describe acyclic triphosphonate amines some of which are halogenated.

EP-A 0 640 655 describes moulding compositions prepared from aromatic polycarbonate, styrene-containing copolymers and graft polymers, which can be equipped to be flame-resistant with monomeric and/or oligomeric phosphorus compounds.

EP-A 0 363 608 describes as flame-proofing additives flame-resistant polymer mixtures prepared from aromatic polycarbonate, styrene-containing copolymer or graft copolymer as well as oligomeric phosphates. The heat deflection temperature of the latter mixtures is frequently insufficient for some applications such as, for example, mouldings within housing components.

U.S. Pat. No. 5,061,745 describes as flame-proofing additives polymer mixtures prepared from aromatic polycarbonate, ABS graft polymer and/or styrene-containing copolymer and monophosphates. The level of stress cracking resistance of the latter mixtures is frequently insufficient for producing thin-walled housing components.

The object of the present invention is to provide polycarbonate/ABS blends having a high heat deflection temperature, which have improved fire resistance and improved mechanical properties such as low-temperature strength, elongation at break, weld line strength and stress cracking resistance as well as an improved yellowness index. This combination of properties is a requirement particularly for applications in the information technology sector, such as for instance for housings of monitors, printers or copiers.

It has now been found that PC/ABS blends which contain phosphonate amines in combination with inorganic nanoparticles have the desired properties.

The present invention therefore provides blends containing polycarbonate and/or polyester carbonate, toughening agent, phosphonate amines and inorganic powder having an average particle diameter smaller than or equal to 200 nm, which may contain further polymers, for example thermoplastic vinyl (co)polymers and/or polyalkylene terephthalates and optionally other additives. The polycarbonate blends preferably contain from 0.1 to 30, in particular 1 to 25, and most particularly preferably 2 to 20 parts by weight phosphonate amine of the formula (I) indicated below, and preferably from 0.5 to 45, in particular 1 to 25, and most particularly preferably 2 to 15 parts by weight of the inorganic powders corresponding to the component E).

The present invention preferably provides blends containing

A) from 40 to 99, preferably 60 to 98.5 parts by weight aromatic polycarbonate and/or polyester carbonate B) from 0.5 to 60, preferably 1 to 40, in particular 2 to 25 parts by weight graft polymer prepared from B.1) from 5 to 95, preferably 30 to 80 wt. % of one or more vinyl monomers on B.2) from 95 to 5, preferably 20 to 70 wt. % of one or more graft backbones having a glass transition temperature<10° C., preferably <0° C., particularly preferably <−20° C., C) from 0 to 45, preferably 0 to 30, particularly preferably 2 to 25 parts by weight of at least one thermoplastic polymer selected from the group comprising vinyl (co)polymers and polyalkylene terephthalates, D) from 0.1 to 30 parts by weight, preferably 1 to 25 parts by weight, particularly preferably 2 to 20 parts by weight phosphonate amine of the formula (I)

$$A_{3-y}\text{-N-B}_y \qquad (I),$$

in which
A stands for a radical of the formula (IIa)

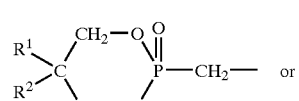

or

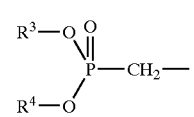

$R^1$ and $R^2$ stand independently of one another for unsubstituted or substituted $C_1$–$C_{10}$-alkyl or for unsubstituted or substituted $C_6$–$C_{10}$-aryl, $R^3$ and $R^4$ stand independently of one another for unsubstituted or substituted C, —$C_{10}$-alkyl or for unsubstituted or substituted $C_6$–$C_{10}$-aryl, or $R^3$ and $R^4$ stand together for unsubstituted or substituted $C_3$–$C_{10}$-alkylene, y denotes the numerical values 0, 1 or 2, and B stands independently for hydrogen, optionally halogenated $C_2$–$C_8$-alkyl, unsubstituted or substituted $C_6$–$C_{10}$-aryl.

E) from 0.5 to 40, preferably 1 to 25, particularly preferably 2 to 15 parts by weight of finely divided inorganic powder having an average particle diameter smaller than or equal to 200 mm, and F) from 0 to 5 parts by weight, preferably 0.1 to 3 parts by weight, particularly preferably 0.1 to 1 part by weight, most particularly preferably 0.1 to 0.5 parts by weight of a fluorinated polyolefin, wherein the sum of the parts by weight of all the components A+B+C+D+E+F is 100.

Component A

Aromatic polycarbonates and/or aromatic polyester carbonates corresponding to the component A, which are suitable according to the invention are known from the literature or can be prepared by processes known from the literature (for example see Schnell, "Chemistry and Physics of Polycarbonates", Interscience Publishers, 1964 as well as DE-AS 1 495 626, DE-OS 2 232 877, DE-OS 2 703 376, DE-OS 2 714 544, DE-OS 3 000 610, DE-OS 3 832 396 for the preparation of aromatic polycarbonates; see, for example, DE-OS 3 077 934 for the preparation of aromatic polyester carbonates).

Aromatic polycarbonates are prepared, for example, by reacting diphenols with carbonic acid halides, preferably phosgene, and/or with aromatic dicarboxylic acid dihalides, preferably benzene dicarboxylic acid dihalides, by the phase boundary process, optionally with use of chain terminators, for example monophenols, and optionally with use of trifunctional or higher-functional branching agents, for example triphenols or tetraphenols.

Diphenols for the preparation of the aromatic polycarbonates and/or aromatic polyester carbonates are preferably those of the formula (II)

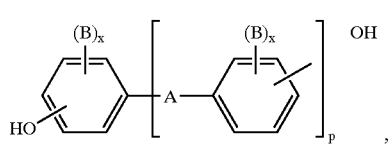

(II)

wherein

A a single bond, $C_1$–$C_5$-alkylene, $C_2$–$C_5$-alkylidene, $C_5$–$C_6$-cycloalkylidene, —O—, —SO—, —CO—, —S—, —SO2—, $C_6$–$C_{12}$-arylene onto which further aromatic rings optionally containing heteroatoms may be condensed, or a radical of the formula (III) or (IV)

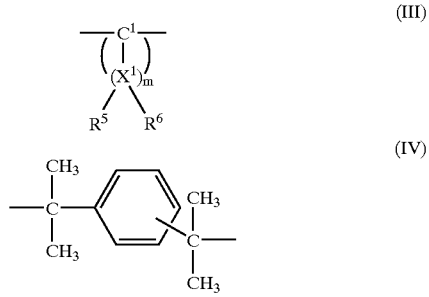

B is in each case $C_1$–$C_{12}$-alkyl, preferably methyl, halogen, preferably chlorine and/or bromine x is in each case independently of one another 0, 1 or 2, p is 1 or 0, and $R^5$ and $R^6$ for each $X^1$ denote in individually selectable manner independently of one another hydrogen or $C_1$–$C_6$-alkyl, preferably hydrogen, methyl or ethyl, $X^1$ denotes carbon, and m denotes an integer from 4 to 7, preferably 4 or 5, with the proviso that on at least one atom $X^1$, $R^5$ and $R^6$ are at the same time alkyl.

Preferred diphenols are hydroquinone, resorcinol, dihydroxydiphenols, bis(hydroxyphenyl)-$C_1$–$C_5$-alkanes, bis(hydroxyphenyl)$C_5$–$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropylbenzene as well as derivatives thereof brominated and/or chlorinated in the ring.

Particularly preferred diphenols are 4,4'-dihydroxydiphenyl, bisphenol A, 2,4bis(4-hydroxyphenyl)-2-methylbutane, 1,1-bis(4hydroxyphenyl) cyclohexane, 1,1-bis(4 hydroxyphenyl)-3,3,5-trimethyl cyclohexane, 4,4'-dihydroxydiphenyl sulfide, 4,4'-dihydroxydiphenyl sulfone as well as derivatives thereof which are di- and tetrabrominated or chlorinated, such as, for example, 2,2-bis(3-chloro-4-hydroxyphenyl) propane, 2,2-bis(3,5-dichloro-4-hydroxyphenyl) propane or 2,2-bis(3,5-dibromo4-hydroxyphenyl) propane.

2,2-bis(4-hydroxyphenyl) propane (bisphenol A) is in particular preferred.

The diphenols may be used either individually or as any mixtures.

The diphenols are known from the literature or are obtainable by processes which are known from the literature.

The following are examples of chain terminators which are suitable for the preparation of the thermoplastic aromatic polycarbonates: phenol, p-chlorophenol, p tert.-butylphenol or 2,4,6-tribromophenol, but also long-chain alkyl phenols such as 4-(1,3-tetramethylbutyl) phenol according to DE-OS 2 842 005 or monoallkylphenol or dialkylphenols having a total of 8 to 20 C atoms in the alkyl substituents, such as 3,5-di-tert.butylphenol, p-iso-octylphenol, p-tert.octylphenol, p-dodecylphenol and 2-(3,5-dimethylheptyl) phenol and 4-(3,5-dimethylheptyl) phenol. The quantity of chain terminators to be used is generally between 0.5 mol % and 10 mol %, related to the molar sum of the diphenols used in each case.

The thermoplastic aromatic polycarbonates have average weight average molecular weights ($M_w$, measured, for example, by ultracentrifuging or light scattering) of 10 000 to 200 000, preferably 20 000 to 80 000.

The thermoplastic aromatic polycarbonates may be branched in known manner, and preferably by the incorporation of from 0.05 to 2.0 mol %, in relation to the sum of the diphenols used, of trifunctional or higher-functional compounds, for example those such as have three or more phenolic groups.

Both homopolycarbonates and also copolycarbonates are suitable. The copolycarbonates according to the invention which correspond to the component A may be prepared with the use of from 1 to 25 wt. %, preferably 2.5 to 25 wt. % (in relation to the total quantity of diphenols to be used) of polydiorganosiloxanes having terminal hydroxyaryloxy groups. These are known (see, for example, U.S. Pat. No. 3,419,634) or may be prepared by processes which are known from the literature. The preparation of polydiorganosiloxane-containing copolycarbonates is described, for example, in DE-OS 3 334 782.

The copolycarbonates of bisphenol A having up to IS mol %, in relation to the molar sum of the diphenols, of other diphenols named as being preferred or particularly preferred, in particular 2,2-bis(3,5-dibromo-4-hydroxyphenyl) propane, are preferred polycarbonates, in addition to the bisphenol A homopolycarbonates.

Aromatic dicarboxylic acid dihalides for the preparation of aromatic polyester carbonates are preferably diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally co-used in the preparation of polyester carbonates as a bifunctional acid derivative.

In addition to the monophenols already named, the chlorocarbonic esters thereof as well as the acid chlorides of aromatic monocarboxylic acids, which may optionally be substituted with $C_1$–$C_{22}$-alkyl groups or with halogen atoms, as well as aliphatic $C_2$–$C_{22}$ monocarboxylic acid chlorides, are considered as chain terminators for the preparation of the aromatic polyester carbonates.

The quantity of chain terminators is in each case from 0.1 to 10 mol %, in relation to moles of diphenols, in the case of the phenolic chain terminators, and in relation to moles of dicarboxylic acid dichlorides, in the case of monocarboxylic acid chloride chain terminators.

The aromatic polyester carbonates may also contain incorporated aromatic hydroxycarboxylic acids.

The aromatic polyester carbonates may be linear and also be branched in known manner (q.v. also DE-OS 2 940 024 and DE-OS 3 007 934).

The following may be used as branching agents, for example: 3- or higher-functional carboxylic acid chlorides such as trimesic acid trichloride, cyanuric acid trichloride, 3, 3', 4, 4'-benzophenone tetracarboxylic acid tetrachloride, 1,4,5,8-naphthalene tetracarboxylic acid tetrachloride or pyromellitic acid tetrachloride, in quantities of from 0.01 to 1.0 mol % (in relation to dicarboxylic acid dichlorides used) or trifunctional or higher-functional phenols such as phloroglucin, 4,6-dimethyl-2,4,6-tri-(4-hydroxyphenyl)-2-heptene 4,4-dimethyl-2,4,6-tri(4-hydroxyphenyl) heptane, 1,3,5-tri4-hydroxyphenyl) benzene, 1,1,1-tri-(4-hydroxyphenyl) ethane, tri-(4-hydroxyphenyl) phenylmethane, 2,2-bis[4,4-bis(4-hydroxyphenyl) cyclohexyl) propane, 2,4-bis(4-hydroxyphenyl isopropyl) phenol, tetra-(4-hydroxyphenyl) methane, 2,6-bis(2-hydroxy-5-methylbenzyl)$_4$-methyl phenol, 2-(4-hydroxyphenyl)-2-(2,4-dihydroxyphenyl) propane, tetra-(4-[4-hydroxyphenyl isopropyl]phenoxy) methane, 1,4-bis(4, 4'-dihydroxytriphenyl)methyl benzene in quantities of from 0.01 to 1.0 mol %, in relation to diphenols used. Phenolic branching agents may be placed in the initial charge with the diphenols, acid chloride branching agents may be introduced together with the acid dichlorides.

The carbonate structural unit content may be varied at will in the thermoplastic aromatic polyester carbonates. The carbonate group content is preferably up to 100 mol %, in particular up to 80 mol %, particularly preferably up to 50 mol %, in relation to the sum of ester groups and carbonate groups. Both the ester content and the carbonate content of the aromatic polyester carbonates may be present in block-form or distributed in random manner in the polycondensate.

The relative solution viscosity ($\eta_{rel}$) of the aromatic polycarbonates and polyester carbonates is within the range 1.18 to 1.4, preferably 1.22 to 1.3 (measured on solutions of 0.5 g polycarbonate or polyester carbonate in 100 ml methylene chloride solution at 25° C.).

The thermoplastic aromatic polycarbonates and polyester carbonates may be used alone or as any intermixture.

Component B

The component B embraces one or more graft polymers prepared from

B.1) from 5 to 95, preferably 30 to 80 wt. % of at least one vinyl monomer on

B.2) from 95 to 5, preferably 70 to 20 wt. % of one or more graft backbones having glass transition temperatures<10° C., preferably <0° C., particularly preferably <−20° C.

The graft backbone B.2 generally has an average particle size ($d_{50}$ value) of from 0.05 to 5 lm, preferably 0.10 to 0.5 $\mu$m, particularly preferably 0.20 to 0.40 $\mu$m.

Monomers B.1 are preferably mixtures prepared from

B.1.1 from 50 to 99 parts by weight vinyl aromatics and/or vinyl aromatics substituted in the ring (such as, for example, styrene, α-methylstyrene, p-methylstyrene, p-chlorostyrene) and/or methacrylic acid ($C_1$–$C_8$)alkyl esters (such as, for example, methyl methacrylate, ethyl methacrylate) and B.1.2 from 1 to 50 parts by weight vinyl cyanides (unsaturated nitriles such as acrylonitrile and methacrylonitrile) and/or (meth)acrylic acid ($C_1$–$C_8$)-alkyl esters (such as, for example, methyl methacrylate, n-butylacrylate, t-butylacrylate) and/or derivatives (such as anhydrides and imides) of unsaturated carboxylic acids (for example maleic anhydride and N-phenyl maleic imide).

Preferred monomers B.1.1 are selected from among at least one of the monomers styrene, α-methylstyrene and methyl methacrylate, preferred monomers B. 1.2 are selected from among at least one of the monomers acrylonitrile, maleic anhydride and methyl methacrylate.

Particularly preferred monomers are B.1.1 styrene and B.1.2 acrylonitrile.

Graft backbones B.2 which are suitable for the graft polymers B are, for example, diene rubbers, EP(D)M rubbers, that is to say rubbers such as are based on ethylene/propylene and optionally diene, acrylic, polyurethane, silicone, chloroprene and ethylene/vinyl acetate rubbers.

Preferred graft backbones B.2 are diene rubbers (for example based on butadiene, isoprene, etc.) or mixtures of diene rubbers or copolymers of diene rubbers or mixtures thereof with further copolymerisable monomers (for example corresponding to B.1.1 and B.1.2), with the proviso that the glass transition temperature of the component B.2 is below <10° C., preferably <0° C., particularly preferably <−10° C.

Pure polybutadiene rubber is particularly preferred.

Particularly preferred polymers B are, for example, ABS polymers (emulsion, bulk and suspension ABS), such as are described in, for example, DE-OS 2 035 390 (=U.S. Pat. No. 3,644,574) or in DE-OS 2 248 242 (=GB-B 1 409 275) or in Ullmann, Enzyklopädie der Technischen Chemie, Vol. 19 (1980), p. 280 et seq. The gel content of the graft backbone B.2 is at least 30 wt. %, preferably at least 40 wt. % (measured in toluene).

The graft copolymers B are prepared by free-radical polymerisation, for example by emulsion, suspension, solution or bulk polymerisation, preferably by emulsion polymerisation.

ABS polymers prepared by redox initiation with an initiator system prepared from organic hydroperoxide and ascorbic acid according to U.S. Pat. No. 4,937,285 are also particularly suitable graft rubbers.

Since in the grafting reaction the graft monomers are known to be not necessarily grafted completely to the graft backbone, according to the invention products such as are obtained as a result of (co)polymerisation of the graft monomers in the presence of the graft backbone and co-arise during working-up are also understood to be among graft polymers B.

Suitable acrylic rubbers corresponding to B.2 of the polymers B are preferably polymers of acrylic acid alkyl esters, optionally having up to 40 wt. %, in relation to B.2, of other polymerisable ethylenically unsaturated monomers. $C_1$–$C_8$-alkyl esters, for example methyl, ethyl, butyl, n-octyl and 2-ethylhexyl esters and halogen alkyl esters, preferably halogen-$C_1$–$C_8$-alkyl esters such as chloroethyl acrylate as well as mixtures of these monomers, are among the preferred polymerisable acrylic acid esters.

In order to bring about cross-linking, monomers having more than one polymerisable double bond may be copolymerised. Preferred examples of cross-linking monomers are esters of unsaturated monocarboxylic acids having 3 to 8 C atoms and of unsaturated monohydric alcohols having 3 to 12 C atoms, or of saturated polyols having 2 to 4OH groups and 2 to 20 C atoms, such as, for example, ethylene glycol dimethacrylate, allyl methacrylate; heterocyclic compounds having multiple unsaturation, such as, for example, trivinyl and triallyl cyanurate; polyfunctional vinyl compounds such as di- and trivinyl benzenes; but also triallyl phosphate and diallyl phthalate.

Preferred cross-linking monomers are allyl methacrylate, ethylene glycol dimethacrylate, diallyl phthalate and heterocyclic compounds having at least 3 ethylenically unsaturated groups.

Particularly preferred cross-linking monomers are the cyclic monomers triallyl cyanurate, triallyl isocyanurate, triacryloyl hexahydro-s-triazine, triallyl benzenes. The quantity of the cross-linked monomers is preferably from 0.02 to 5, in particular 0.05 to 2 wt. %, in relation to the graft backbone B.2.

In the case of cyclic cross-linking monomers having at least 3 ethylenically unsaturated groups it is advantageous to restrict the quantity to less than 1 wt. % of the graft backbone B.2.

Examples of preferred "other" polymerisable ethylenically unsaturated monomers which, in addition to the acrylic acid esters, can optionally serve for the preparation of the graft backbone B.2 are acrylonitrile, styrene, α-methylstyrene, acrylamides, vinyl-$C_1$–$C_8$-alkyl ethers, methyl methacrylate, butadiene. Preferred acrylic rubbers as the graft backbone B.2 are emulsion polymers having a gel content of at least 60 wt. %.

Further suitable graft backbones corresponding to B.2 are silicone rubbers having graft-reactive sites, such as are described in DE-OS 3 704 657, DE-OS 3 704 655, DE-OS 3 631 540 and DE-OS 3 631 539.

The gel content of the graft backbone B.2 is determined at 25° C. in a suitable solvent (M. Hoffmann, H. Krömer, R. Kuhn, Polymeranalytik I and II, Georg Thieme-Verlag, Stuttgart 1977).

The average particle size $d_{50}$ is the diameter above and below which, respectively, 50 wt. % of the particles lie. It can be determined by ultracentrifuge measurement (W. Scholtan, H. Lange, Kolloid-Z. und Z. Polymere 250 (1972), 782-796).

Component C

The component C embraces one or more thermoplastic vinyl (co)polymers C. I and/or polyalkylene terephthalates C.2.

Polymers of at least one monomer from the group comprising vinyl aromatics, vinyl cyanides (unsaturated nitrites), (meth)acrylic acid-($C_1$–$C_8$)-alkyl esters, unsaturated carboxylic acids and derivatives (such as anhydrides and imides) of unsaturated carboxylic acids are suitable as vinyl (co)polymers C. 1. (Co)polymers prepared from C.1.1 from 50 to 99, preferably 60 to 80 parts by weight vinyl aromatics and/or vinyl aromatics substituted in the ring (such as, for example, styrene, α-methyl styrene, p-methylstyrene, p-chlorostyrene) and/or methacrylic acid-($C_1$–$C_8$) alkyl esters (such as, for example, methyl methacrylate, ethyl methacrylate), and C.1.2 from 1 to 50, preferably 20 to 40 parts by weight vinyl cyanides (unsaturated nitriles) such as acrylonitrile and methacrylonitrile and/or (meth)acrylic acid-($C_1$–$C_8$)-alkyl esters (such as, for example methyl-methacrylate, n-butylacrylate, t-butylacrylate) and/or unsaturated carboxylic acids (such as maleic acid) and/or derivatives (such as anhydrides and imides) of unsaturated carboxylic acids (for example maleic anhydride and N-phenyl maleic imide)
are in particular suitable.

The (co)polymers C. 1 are resinous, thermoplastic and rubber-free.

The copolymer prepared from C.1.1 styrene and C.1.2 acrylonitrile is particularly preferred. The (co)polymers corresponding to C.1 are known and can be prepared by free-radical polymerisation, in particular by emulsion, suspension, solution or bulk polymerisation. The (co)polymers corresponding to the component C. 1 preferably have molecular weights M>(weight average, determined by light scattering or sedimentation) of between 15 000 and 200 000.

The polyalkylene terephthalates of the component C.2 are reaction products of aromatic dicarboxylic acids or reactive derivatives thereof such as dimethyl esters or anhydrides, and aliphatic, cycloaliphatic or araliphatic diols as well as mixtures of these reaction products.

Preferred polyalkylene terephthalates contain at least 80 wt. %, preferably at least 90 wt. %, in relation to the dicarboxylic acid component, of terephthalic acid radicals and at least 80 wt. %, preferably at least 90 wt. %, in relation to the diol component, of ethylene glycol radicals and/or butanediol-1,4 radicals.

The preferred polyalkylene terephthalates may contain in addition to terephthalic acid esters up to 20 mol %, preferably up to 10 mol %, of radicals of other aromatic or cycloaliphatic dicarboxylic acids having 8 to 14 C atoms or of aliphatic dicarboxylic acids having 4 to 12 C atoms, such as, for example, radicals of phthalic acid, isophthalic acid, naphthalene-2,6dicarboxylic acid, 4,4-diphenyl dicarboxylic acid, succinic acid, adipic acid, sebacic acid, azelaic acid, cyclohexanediacetic acid.

The preferred polyalkylene terephthalates may contain in addition to ethylene glycol esters or butanediol-1,4 esters up to 20 mol %, preferably up to 10 mol %, of other aliphatic diols having 3 to 12 C atoms or cycloaliphatic diols having 6 to 21 C atoms, for example radicals of 1,3-propanediol, 2-ethyl-1,3-propanediol, neopentyl glycol, 1,5-pentanediol, 1,6hexanediol, cyclohexane-1,4dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(B-hydroxyethoxy) benzene, 2,2-bis(4-hydroxycyclohexyl) propane, 2,4-dihydroxy-1,1,3,3-tetramethyl cyclobutane, 2,2-bis(4-β-hydroxyethoxyphenyl) propane and 2,2-bis(4-hydroxypropoxyphenyl) propane (DE-OS 2 407 674, DE-OS 2 407 776, DE-OS2 715 932).

The polyalkylene terephthalates may be branched by the incorporation of relatively small quantities of trihydric or tetrahydric alcohols or tribasic or tetrabasic carboxylic acids, for example according to DE-OS 1 900 270 and U.S. Pat. No. 3,692,744.

Examples of preferred branching agents are trimesic acid, trimellitic acid, trimethylol ethane and trimethylol propane and pentaerythritol.

Polyalkylene terephthalates which have been prepared solely from terephthalic acid and reactive derivatives thereof (for example dialkyl esters thereof) and ethylene glycol and/or 1,4-butanediol, and mixtures of these polyalkylene terephthalates are particularly preferred.

Mixtures of polyalkylene terephthalates contain from 1 to 50 wt. %, preferably 1 to 30 wt. %, of polyethylene terephthalate and from 50 to 99 wt. %, preferably 70 to 99 wt. %, of polybutylene terephthalate.

The polyalkylene terephthalates which are preferably used generally have an intrinsic viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates may be prepared by known methods (see, for example, Kunststoff-Handbuch, Vol. VIII, p. 695 et seq., Carl-Hanser-Verlag, Munich 1973).

Component D

The moulding compositions according to the invention contain as the flame retardant at least one phosphonate amine compound of the formula (I)

$$A_{3-y}\text{-N-}B_y \qquad (I)$$

in which

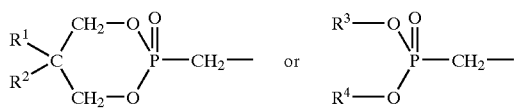

A stands for
wherein $R^1$, $R^2$, $R^3$ and $R^4$ as well as B and y denote the same as indicated hereinabove.

B preferably stands independently for hydrogen, ethyl, n- or iso-propyl, which may be substituted with halogen, $C_6$–$C_{10}$-aryl which may be unsubstituted or substituted with $C_1$–$C_4$-alkyl and/or halogen, in particular phenyl or naphthyl.

Alkyl in $R^1$, $R^2$, $R^3$ and $R^4$ preferably stands independently for methyl, ethyl, n-propyl, iso-propyl, n-, iso-, sec.- or tert.-butyl, pentyl or hexyl.

Substituted alkyl in $R^1$, $R^2$, $R^3$ and $R^4$ preferably stands independently for halogen-substituted $C_1$–$C_{10}$-alkyl, in particular for mono- or di-substituted methyl, ethyl, n-propyl, iso-propyl, n-, iso-, sec.- or tert.-butyl, pentyl or hexyl.

$R^3$ and $R^4$ preferably form, together with the carbon to which they are attached, cyclopentyl, cyclohexyl, cycloheptyl or cyclooctyl, in particular cyclopentyl or cyclohexyl.

$C_6$–$C_{10}$-aryl in $R^1$, $R^2$, $R^3$ and $R^4$ preferably stands independently for phenyl, naphthyl or binaphthyl, in particular o-phenyl, o-naphthyl, o-binaphthyl, which may be substituted (generally once, twice or three times) with halogen.

The following are named as examples and preferably: 5,5,5',5',5",5"-hexamethyl-tris (1,3,2-dioxaphosphorinane methan)amin-2,2',2"-trioxide of the formula (1-1)

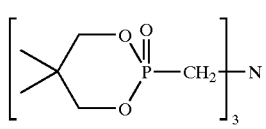

(Experimental product XPM 1000, from Solutia Inc., St. Louis, USA) 1,3,2-dioxaphosphorinane-2-methanamine, N-butyl-N[(5,5-dimethyl-1,3,2-dioxaphosphorinan-2-yl)methyl]-5,5-dimethyl-, P,2-dioxides; 1,3,2-dioxaphosphorinane-2-methanamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide; 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide; 1,3,2-dioxaphosphorinane-2-methanamine, N-butyl-N-[(5,5-dichloromethyl-1,3,2-dioxaphosphorinan-2-yl)-methyl]5,5-di-chloromethyl-, P,2-dioxide; 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-2oxides; 1,3,2-dioxaphosphorinane-2-methanimine, N-[(5,5-dimethyl-1,3,2-dioxaphosphorinan-2-yl)methane]-N-(2-chloroethyl)5,5-di(chloromethyl)-, P2-dioxide.

The following are furthermore preferred:
Compounds of the formula (1-2) or (1-3)

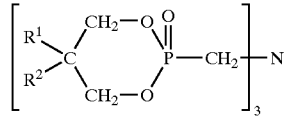

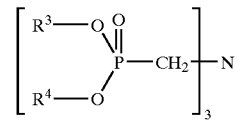

wherein $R^1$, $R^2$, $R^3$ and $R^4$ denote the same as indicated hereinabove.

Compounds of the formula (1-2), (1-1) are particularly preferred. The individual compounds named hereinabove are also particularly preferred.

The compounds of the formula (I) may be prepared by the following processes:

a) $PCl_3$ is added to a mixture of 1,3-diol derivatives, water and an organic solvent at a temperature of from 10 to 60° C. A 5,5-disubstituted 1,3,2-dioxaphosphorinane-2-oxide of the formula (Ia)

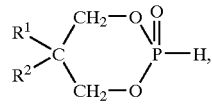

is obtained here,
wherein $R^1$ and $R^2$ denote the same as indicated hereinabove, b) after purification the 1,3,2dioxaphosphorinane-2-oxide is reacted in paraformaldehyde with an amine $B_yNH_{3-y}$, wherein B and y denote the same as indicated hereinabove, c) after re-purification and drying the phosphonate amine of the formula (1) is obtained.

A detailed description of the method of preparation can be found in US Patent Specification 5 844 028.

Component E

The component E embraces very finely divided inorganic powders.

The very finely divided inorganic powders E to be used according to the invention preferably consist of at least one polar compound of one or more metals of the 1st to the 5th main groups or the 1st to 8th sub-groups of the Periodic Table, preferably the 2nd to 5th main groups or the 4th to 8th subgroups, particularly preferably the 3rd to 5th main groups or the 4th to 8th sub-groups, with at least one element selected from among oxygen, hydrogen, sulfur, phosphorus, boron, carbon, nitrogen and silicon.

Preferred compounds are, for example, oxides, hydroxides, hydrated oxides, sulfates, sulfites, sulfides, carbonates, carbides, nitrates, nitrites, nitrides, borates, silicates, phosphates, hydrides, phosphites or phosphonates.

The very finely divided inorganic powders preferably consist of oxides, phosphates, hydroxides, preferably $TiO_2$, SiO, $SnO_2$, ZnO, ZnS, boehmite, $ZrO_2$, $Al2O_3$, aluminium phosphates, furthermore TiN, WC, AJO(OH), $Sb_2O_3$, iron oxides, $NASO_4$, vanadium oxides, zinc borate, silicates such as aluminium silicates, magnesium silicates, one-, two- and three-dimensional silicates. Mixtures and doped compounds are also able to be used.

Furthermore, these nano-scale particles may be surface-modified with organic molecules in order to improve compatibility with the polymers. Hydrophobic or hydrophilic surfaces can be generated in this manner.

Hydrate-containing aluminium oxides, for example boehmite or $TiO_2$, are particularly preferred.

The average particle diameters of the nanoparticles are smaller than or equal to 200 nm, preferably smaller than or equal to 150 nm, in particular 1 to 100 nm.

Particle size and particle diameter always denote the average particle diameter $d_{50}$, determined by ultracentrifuge measurements in accordance with W. Scholtan et al., Kolloid-Z. und Z. Polymere 250 (1972), pp. 782–796.

The inorganic powder is incorporated into the thermoplastic moulding composition, in quantities of from 0.5 to 40, preferably 1 to 25, particularly preferably 2 to 15 wt. %, in relation to the thermoplastic moulding material.

The inorganic compounds may be present as powders, pastes, sols, dispersions or suspensions. Powders can be obtained by precipitation from dispersions, sols or suspensions.

The powders can be incorporated in the thermoplastic moulding compositions by conventional processes, for example by direct kneading or by extrusion of moulding compositions and the very finely divided inorganic powders. Preferred methods are the preparation of a master batch, for example of flame retardant additives and at least one component of the moulding compositions according to the invention in monomers or solvents, or co-precipitation of a thermoplastic component and the very finely divided inorganic powders, for example by co-precipitation of an aqueous emulsion and the very finely divided inorganic powders, optionally in the form of dispersions, suspensions, pastes or sols of the very finely divided inorganic materials.

Component F

The fluorinated polyolefins F are of high molecular weight and have glass transition temperatures above –30° C., generally above 100° C., fluorine contents preferably of from 65 to 76, in particular 70 to 76 wt. %, average particle diameters $d_{50}$ of from 0.05 to 1,000, preferably 0.08 to 20 μm. The fluorinated polyolefins F generally have a density of from 1.2 to 2.3 g/cm³. Preferred fluorinated polyolefins F are polytetrafluoroethylene, polyvinylidene fluoride, copolymers of tetrafluoroethylene/hexafluoropropylene and of ethylene/tetrafluoroethylene. The fluorinated polyolefins are known (cf "Vinyl and Related Polymers" by Schildknecht, John Wiley & Sons, Inc., New York, 1962, pp. 484–494: "Fluoropolymers" by Wall, Wiley-Interscience, John Wiley & Sons, Inc., New York, Vol. 13, 1970, pp. 623–654; "Modem Plastics Encyclopedia", 1970-1971, Vol. 47, No. 10 A, October 1970, McGraw-Hill, Inc., New York, pp. 134 and 774; "Modem Plastics Encyclopedia", 1975-1976, October 1975, Vol. 52, No. 10 A, McGraw-Hill Inc., New York, pp. 27, 28 and 472 and U.S. Pat. No. 3,671,487, U.S. Pat. No. 3,723,373 and U.S. Pat. No. 3,838,092).

They may be prepared by known processes, for example by polymerisation of tetrafluoroethylene in an aqueous medium with a free radical-forming catalyst, for example sodium peroxydisulfate, potassium peroxydisulfate or ammonium peroxydisulfate, at pressures of from 7 to 71 kg/cm² and temperatures of from 0 to 200° C., preferably at temperatures of from 20 to 100° C. (For more detailed information, see, for example, U.S. Pat. No. 2,393,967). Depending on the form in which they are used, the density of these materials may be between 1.2 and 2.3 g/cm³, and the average particle size between 0.5 and 1,000 μm.

Fluorinated polyolefins F which are preferred according to the invention are tetrafluoroethylene polymers having average particle sizes of from 0.05 to 20 μm, preferably 0.08 to 10 μm, and a density of from 1.2 to 1.9 g/cm³, and they are preferably used in the form of a coagulated mixture of emulsions of the tetrafluoroethylene polymers F with emulsions of the graft polymers B.

Suitable fluorinated polyolefins F which can be used in powder form are tetrafluoroethylene polymers having average particle diameters of from 100 to 1,000 μm and densities of from 2.0 g/cm³ to 2.3 g/cm³.

In order to prepare a coagulated mixture of B and F, an aqueous emulsion (latex) of a graft polymer B is first mixed with a finely divided emulsion of a tetrafluoroethylene polymer F; suitable tetrafluoroethylene polymer emulsions generally have solids contents of from 30 to 70 wt. %, in particular 50 to 60 wt. %, preferably 30 to 35 wt. %.

The quantities indicated in the description of the component B may include the proportion of the graft polymer for the coagulated mixture of graft polymer and fluorinated polyolefins.

In the emulsion mixture the equilibrium ratio of graft polymer B to the tetrafluoroethylene polymer F is from 95:5 to 60:40. The emulsion mixture is then coagulated in known manner, for example by spray drying, freeze drying or coagulation by the addition of inorganic or organic salts, acids, bases or organic water-miscible solvents such as alcohols, ketones, preferably at temperatures of from 20 to 150° C., in particular 50 to 100° C. If necessary, it may be dried at from 50 to 200° C., preferably 70 to 100° C.

Suitable tetrafluoroethylene polymer emulsions are conventional commercial products available, for example, as Teflon® 30 N from DuPont.

The moulding compositions according to the invention may contain at least one of the conventional additives such as lubricants and mould release agents, nucleating agents, antistatic agents, stabilisers, as well as dyes and pigments.

The moulding compositions according to the invention may contain up to 35 wt. %, in relation to the total moulding composition, of a further flame retardant, optionally having a synergistic effect. Examples of compounds which may be named as further flame retardants are organic phosphorus compounds such as are described in EP-A 363 608, EP-A 345 522 and EP-A 640 655, for example, organic halogen compounds such as decabromobisphenyl ether, tetrabromobisphenol, inorganic halogen compounds such as ammonium bromide, nitrogen compounds such as melamine, melamine formaldehyde resins, inorganic hydroxide compounds such as magnesium hydroxide, aluminium hydroxide, inorganic compounds such as antimony oxides, barium metaborate, hydroxoantimonate, zirconium oxide, zirconium hydroxide, molybdenum oxide, ammonium molybdate, zinc borate, ammonium borate, talcum, silicate, silicon dioxide and tin oxide, as well as siloxane compounds.

Phosphorus compounds of the formula (V)

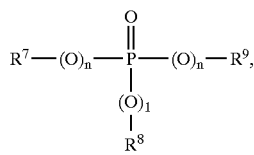

in which

R[7], R[1] and R[9] are independently of one another an optionally halogenated $C_1–C_8$-alkyl or an optionally halogenated and/or alkylated $C_5$ or $C_6$-cycloalkyl or an optionally halogenated and/or alkylated and/or aralkylated $C_6–C_{30}$-aryl, and "n" and "1" are independently of one another 0 or 1, are furthermore suitable as flame retardants.

These phosphorus compounds are generally known (see, for example, Ullmann, Enzyklopädie der technischen Chemie, Vol. 18, p. 301 et seq., 1979 and EP-A 345 522). The aralkylated phosphorus compounds are described in DE-OS 38 24 356, for example.

Optionally halogenated $C_5$- or $C_6$-alkyl radicals corresponding to (V) may be mono- or polyhalogenated and may be linear or branched. Examples of alkyl radicals are chloroethyl, 2-chloropropyl, 2,3-dibromopropyl, butyl, methyl or octyl.

Optionally halogenated and/or alkylated $C_5$— or $C_6$-cycloalkyls corresponding to (V) are optionally mono- or polyhalogenated and/or alkylated $C_5$- or $C_6$-cycloalkyls, and therefore, for example, cyclopentyl, cyclohexyl, 3,3,5-trimethylcyclohexyl and fully chlorinated cyclohexyl.

Optionally halogenated and/or alkylated and/or aralkylated $C_6–C_{30}$-aryl radicals corresponding to (V) are optionally mononuclear or polynuclear, mono or polyhalogenated and/or alkylated and/or aralkylated, for example chlorophenyl, bromophenyl, pentachlorophenyl, pentabromophenyl, phenyl, cresyl, isopropylphenyl, benzyl-substituted phenyl and naphthyl.

R[7], R[8] and R[9] preferably stand independently of one another for methyl, ethyl, butyl, octyl, phenyl, cresyl, cumyl or naphthyl. Particularly preferably R[7], R[8] and R[9] stand independently of one another for methyl, ethyl, butyl, phenyl optionally substituted with methyl and/or ethyl.

Phosphorus compounds corresponding to the formula (V), which may be used according to the invention are, for example, tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, tris-(p-benzylphenyl) phosphate, triphenyl phosphine oxide, methanephosphonic acid dimethylester, methanephosphonic acid dipentylester and phenylphosphonic acid diethylester.

Suitable flame retardants are also dimeric and oligomeric phosphates such as are described in EP-A 0 363 608, for example.

The moulding compositions according to the invention may contain as flame retardants phosphorus compounds corresponding to the formula (VI)

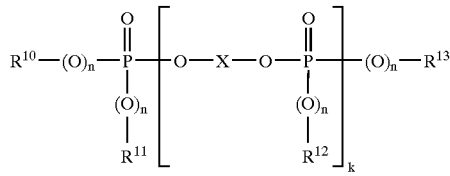

In the formula R[10], R[11], R[12] and R[13] stand independently of one another in each case for optionally halogenated $C_1–C_8$-alkyl, $C_5–C_6$-cycloalkyl, $C_6–C_{20}$-aryl or $C_7–C_{12}$-aralkyl.

Preferably R[10], R[11], R[12] and R[13] stand independently of one another for $C_1–C_4$-alkyl, phenyl, naphthyl or phenyl-$C_1–C_4$-alkyl. The aromatic groups R[10], R[11], R[12] and R[13] may themselves be substituted with halogen groups and/or alkyl groups, preferably chlorine, bromine and/or $C_1–C_4$-alkyl. Particularly preferred aryl radicals are cresyl, phenyl, xylenyl, propylphenyl or butylphenyl as well as the corresponding brominated and chlorinated derivatives thereof.

X in the formula (VI) denotes a mononuclear or polynuclear aromatic radical having 6 to 30 C atoms. This is preferably derived from diphenols of the formula (1). Diphenylphenol, bisphenol A, resorcinol or hydroquinone or chlorinated or brominated derivatives thereof are particularly preferred.

n in the formula (VI) can independently of one another be 0 or I, preferably n equals 1.

k stands for values from 0 to 30, preferably for an average value of from 0.3 to 20, particularly preferably 0.5 to 10, in particular 0.5 to 6.

Mixtures of from 10 to 90 wt. %, preferably 12 to 40 wt. %, of at least one monophosphorus compound of the formula (V) and at least one oligomeric phosphorus compound or a mixture of oligomeric phosphorus compounds as described in EP-A-363 608 as well as phosphorus compounds corresponding to the formula (VI) may also be used in quantities of from 10 to 90 wt. %, preferably 60 to 88 wt. %, in relation to the total quantity of phosphorus compounds.

Monophosphorus compounds of the formula (V) are in particular tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted arylphosphates, methylphosphonic acid dimethylester, methylphosphonic acid diphenylester, phenylphosphonic acid diethylester, triphenylphosphine oxide or tricresylphosphine oxide.

The mixtures of monomeric and oliogmeric phosphorus compounds of the formula (VI) have average k values of from 0.3 to 20, preferably 0.5 to 10, in particular 0.5 to 6.

The named phosphorus compounds are known (cf., for example, EP-A-363 608, EP-A-640 655) or can be prepared by known methods by analogy (for example Ullmanns Encyklopädie der technischen Chemie, Vol. 18, p. 301 et seq. 1979; Houben-Weyl, Methoden der organischen Chemie, Vol. 12/1, p. 43; Beilstein, Vol. 6,p. 177).

The moulding compositions according to the invention which contain the components A to F and optionally further known additives such as stabilisers, dyes, pigments, lubricants and mould release agents, nucleating agents as well as antistatic agents are prepared in that the respective constituents are mixed in known manner and are melt-compounded and melt-extruded at temperatures of from 200° C. to 300° C. in conventional machine units such as internal mixers, extruders and twin screw-type units, with the component F being preferably used in the form of the coagulated mixture already mentioned.

The individual constituents can be mixed in known manner in both sequential and also simultaneous manner, both at approximately 20° C. (room temperature) and also at a higher temperature.

Owing to the excellent flame resistance and heat deflection temperature of the thermoplastic moulding compositions according to the invention as well as their good properties such as weld line strength and ESC behaviour (stress cracking resistance), they are suitable for producing moulded bodies of all kinds, in particular those required to meet high fracture resistance requirements.

The moulding compositions of the present invention may be used to produce moulded bodies of all kinds. In particular, moulded bodies may be made by injection moulding. Examples of moulded bodies which can be made are: housing components of all kinds, for example for domestic appliances such as juice presses, coffee machines, mixers, for office machines such as monitors, printers, copiers, or covers for the construction sector and components for the automotive sector. They can moreover be used in the electrotechnical field because they have very good electrical properties.

The moulding compositions according to the invention can furthermore be used for producing the following moulded bodies and mouldings:

interior fittings for rail vehicles, hub caps, housings for electrical equipment containing small transformers, housings for communications technology equipment, housings and cases for medical purposes, massage equipment and housings, toy vehicles for children, flat walling elements, housings for safety devices, rear spoilers, thermally insulating transport containers, equipment for the housing or care of small animals, mouldings for sanitary and bathroom fittings, cover grates for ventilator openings, mouldings for summer houses and tool sheds, housings for horticultural equipment.

A further form of processing is the production of moulded bodies by deep-drawing from previously produced sheet or film.

The present invention therefore further provides the use of the moulding compositions according to the invention for the production of moulded bodies of all kinds, preferably those mentioned hereinabove, as well as the moulded bodies prepared from the moulding compositions according to the invention.

EXAMPLES

Component A

Linear polycarbonate based on bisphenol A, having a relative solution viscosity of 1.252, measured in $CH_2Cl_2$ as the solvent at 25° C. and at 0.5 gl100 ml concentration.

Component B

Graft polymer prepared from 40 parts by weight of a copolymer of 73:27 styrene and acrylonitrile on 60 parts by weight of particulate cross-linked polybutadiene rubber (average particle diameter $d_,=0.28$ μm), prepared by emulsion polymerisation.

Component C

Styrene/acrylonitrile copolymer having a 72:28 weight ratio of styrene to acrylonitrile and an intrinsic viscosity of 0.55 dl/g (measured in dimethyl formamide at 20° C.).

Component D

Phosphonate amine of the formula:

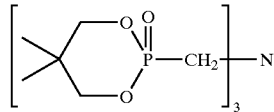

(XPM 1000 development product from Solutia Inc., St. Louis, USA)

Component E

Pural®200, an aluminium oxide hydroxide (from Condea, Hamburg, Germany), average particle size approx. 50 nm.

Component F

Tetrafluoroethylene polymer as a coagulated mixture prepared from a styrene/acrylonitrile graft polymer emulsion corresponding to the aforementioned component B in water and a tetrafluoroethylene polymer emulsion in water. The weight ratio of graft polymer B to tetrafluoroethylene polymer E in the mixture is 90 wt. %: 10 wt. %. The tetrafluoroethylene polymer emulsion has a solids content of 60 wt. %, the average particle diameter is between 0.05 and 0.5 μm. The styrene/acrylonitrile graft polymer emulsion has a solids content of 34 wt. % and an average latex particle diameter of $d_{50}$ 0.28 μm.

Preparation of F

The emulsion of tetrafluoroethylene polymer (Teflon 30 N from DuPont) is mixed with the emulsion of the styrene/acrylonitrile graft polymer B and is stabilised with 1.8 wt. %, in relation to polymer solids, of phenolic antioxidants. The mixture is coagulated at from 85 to 95° C. with an aqueous solution of $MgSO_4$ (hydrated magnesium sulfate) and ethanoic acid at pH 4 to 5, filtered and washed until virtually free of electrolyte, after which the majority of the water is removed by centrifuging, and it is dried to a powder at 100° C. This powder can then be compounded with the other components in the machine units described.

Preparation and testing of the moulding compositions according to the invention

The components are mixed in a 3-liter internal mixer. The moulded bodies are produced on an Arburg 270 E injection moulding machine at 260° C.

The Vicat B softening point is determined in accordance with DIN 53 460 (ISO 306) on 80×10×4mm bars.

The notched impact strength $a_k$ is determined in accordance with ISO 180/1 A.

In order to determine the weld line strength, the impact strength to DIN 53 453 is measured at the weld line of bilaterally purged 170×10×4 mm test pieces (processing temperature: 260° C.).

The burning behaviour of the samples was measured in accordance with UL-Subj 94 V on 127×12.7×1.6 mm bars produced on an injection moulding machine at 260° C.

The UL 94 V test is performed as follows:

Samples of the material are moulded into 127×12.7×1.6 mm bars. The bars are mounted vertically such that the underside of the specimen is located 305 mm above a strip of surgical dressing material. Each specimen bar is ignited individually by means of two sequential 10-second ignition operations, the burning characteristics after each ignition operation are observed, and the specimen is afterwards evaluated. A Bunsen burner having a 100 mm-high (3.8 inch) blue natural gas flame of thermal unit $3.73×10^4$ kJ/m$^3$ (1,000 BTU per cubic foot) is used to ignite the specimen.

The UL 94 V-0-classification covers the characteristics of materials tested in accordance with the UL 94 V regulation, as described below. The moulding compositions in this class do not include specimens which burn for longer than 10 seconds after each test flame impingement; they show no total flame times of more than 50 seconds when flame impingement has been performed twice on each set of specimens; they do not include specimens which burn off completely up to the holding clamp attached at the upper end of the specimen; they do not include specimens which as a result of burning drops or particles ignite the cotton wool arranged below the specimen; nor do they contain specimens which smoulder for longer than 30 seconds after removal of the test flame.

Other UL 94 classifications designate samples which are less flame-resistant or less self-extinguishing because they release flaming drops or particles. These classifications are designated UL 94 V-1 and V-2. The classification F means "failed" and applies to specimens having a post-burning time of 2 30 seconds.

The stress cracking behaviour (ESC behaviour) is examined on 80×10×4 nmu bars, processing temperature 260° C. The testing medium used is a mixture of 60 vol. % toluene and 40 vol. % isopropanol. The specimens are pre-extended by means of a circular arc template (pre-extension indicated as a percentage) and stored at room temperature in the testing medium. The stress cracking behaviour is evaluated in the testing medium by way of the occurrence of cracking or fracture as a function of the pre-extension.

The properties of the moulding compositions according to the invention are summarised in Table 1 below:

By using the combination of phosphonate amines and very finely divided inorganic powder moulding compositions having a high heat deflection temperature are obtained which are distinguished by very good mechanical properties such as low-temperature notched impact strength, stress cracking resistance, weld line strength and elongation at break as well as a reduced yellowness index. The flame retardancy of the moulding compositions according to the invention is markedly improved by the addition of very finely divided inorganic powder.

TABLE

| Moulding compositions and properties | | |
|---|---|---|
|  | 1 (Comparison) | 2 |
| Components [parts by weight] | | |
| A | 68.50 | 67.96 |
| B | 6.80 | 6.75 |
| C | 9.30 | 9.23 |
| D | 10.80 | 10.72 |
| E | — | 0.74 |
| F | 4.2 | 4.2 |
| Mould release agent | 0.4 | 0.4 |
| Properties | | |
| $a_k$ [kJ/m$^2$] −20° C. | 13 | 13.5 |
| Vicat B 120 [° C.] | 116 | 117 |
| $a_n$ (weld line) [kJ/m$^2$] | 4.9 | 5.5 |
| ESC behaviour: | | |
| Fracture at $\epsilon_x$ [%] | 1.8 | 2.4 |
| UL 94 V 1.6 mm | F | V1 |
| Elongation at break DR [%] | 40 | 55 |
| Yellowness index | 58.5 | 52.2 |

F = failed

What is claimed is:

1. A thermoplastic molding composition comprising (A) at least one resin selected from the group consisting of polycarbonate and polyester carbonate,
(B) graft polymer, (D) phosphonate amine and (E) inorganic powder having an average particle diameter smaller than or equal to 200 nm.

2. The composition of claim 1 wherein phosphonate amine is present in an amount of 0.1 to 30 parts by weight and conforms to formula (I)

$$A_{3-y}\text{-N-B}_y \qquad (I)$$ 

in which
A stands for a radical of the formula (IIa)

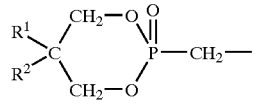

(IIa)

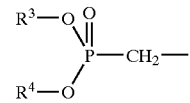

(IIb)

$R^1$ and $R^2$ stand independently of one another for unsubstituted or substituted $C_1$–$C_{10}$-alkyl or for unsubstituted or substituted $C_6$–$C_{10}$-aryl, $R^3$ and $R^4$ stand independently of one another for unsubstituted or substituted $C_1$–$C_{10}$-alkyl or for unsubstituted or substituted $C_6$–$C_{10}$-aryl, or $R^3$ and $R^4$ stand together for unsubstituted or substituted $C_3$–$C_{10}$-alkylene, y denotes 0, 1 or 2, and B stands independently for hydrogen, optionally halogenated $C_2$–$C_8$-alkyl, unsubstituted or substituted $C_6$–$C_{10}$-aryl, and wherein inorganic powder is present in an amount of 0.5 to 40 parts by weight, wherein the quantities indicated are in relation to the total mixture.

3. The composition of claim 2 wherein
A) is present in an amount of 40 to 99 parts by weight, and
B) that is present in an amount of 0.5 to 60 parts by weight and contains B.1) 5 to 95 wt. % of one or more vinyl monomers grafted on
B.2) 95 to 5 wt. % of one or more graft backbones having a glass transition temperature<10° C., and
C) 0 to 45 parts by weight of at least one thermoplastic polymer selected from the group consisting of vinyl (co)polymers and polyalkylene terephthalates, and
D) is present in an amount of 0.1 to 30 parts by weight, and
E) is present in an amount of 0.5 to 40 parts by weight, and further containing
F) 0 to 5 parts by weight of a fluorinated polyolefin, wherein the sum of the parts by weight of all the blend components is 100.

4. The composition of claim 3 containing 60 to 98.5 parts by weight of A,1 to 40 parts by weight of B,0 to 30 parts by weight of C,1 to 25 parts by weight of D, 1 to 25 parts by weight of E and 0.15 to 1 part by weight of F.

5. The composition of claim 3 wherein C is present in an amount of 2 to 25 parts by weight.

6. The composition of claim 3 wherein D is present in an amount of 2 to 20 parts by weight.

7. The composition of claim 3 wherein B.1 is a mixture of
B.1.1 50 to 99 parts by weight vinyl aromatics and/or vinyl aromatics substituted in the ring and/or methacrylic acid ($C_1$–$C_8$)-alkyl esters and
B. 1.2 1 to 50 parts by weight vinyl cyanides and/or (meth)acrylic acid ($C_1$–$C_8$)-alkyl esters and/or derivatives of unsaturated carboxylic acids.

8. The composition of claim 3 wherein the graft backbone is at least one rubber selected from the group consisting of diene rubbers, EP(D)M rubbers, acrylic, polyurethane, silicone, chloroprene and ethylene/vinyl acetate rubbers.

9. The composition of claim 3 wherein D is a member selected from the group consisting of 5,5,5',5',5",5"-hexamethyltris(1,3,2-dioxaphosphorinane methan)amino-2,2',2"-trioxide, 1,3,2-dioxaphosphorinane-2-methanamine, N-butyl-N[(5,5-dimethyl-1,3,2-dioxaphosphorinan-2-yl)methyl]-5,5-dimethyl-, P,2-dioxides; 1,3,2-dioxaphosphorinane-2-methanamine, N-[(5,5-dimethyl 1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide; 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide; 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide; 1,3,2-dioxaphosphorinane-2-methanamine, N-[(5,5-dichloromethyl-1,3,2-dioxaphosphorinan-2-yl)-methyl]-5,5-di-chloromethyl —N-phenyl-, P,2-dioxide; 1,3,2-dioxaphosphorinane-2-methanamine, N,N-di-(4-chlorobutyl)-5,5-dimethyl-2-oxides; 1,3,2-dioxaphosphorinane-2-methanimine and N-[(5,5-dimethyl-1,3,2-dioxaphosphorinan-2-yl)methane]-N-(2-chloroethyl)-5,5-di(chloromethyl), P2-dioxide.

10. The composition of claim 3 wherein E is at least one polar compound of one or more metals of the 1st to the 5th main groups or the 1st to 8th subgroups of the Periodic Table, with at least one element selected from the group consisting of oxygen, hydrogen, sulfur, phosphorus, boron, carbon, nitrogen and silicon.

11. The composition of claim 10 wherein E is at least one polar compound of one or more metals of the 2nd to 5th main groups or the 4th to 8th sub-groups of the Periodic Table, with at least one element selected from the group consisting of oxygen, hydrogen, sulfur, phosphorus, boron, carbon, nitrogen and silicon.

12. The composition of claim 10 wherein E is at least one polar compound of one or more metals of the 3rd to 5th main groups or the 4th to 8th sub-groups of the Periodic Table, with at least one element selected from the group consisting of oxygen, hydrogen, sulfur, phosphorus, boron, carbon, nitrogen and silicon.

13. The composition of claim 10 wherein E is at least one member selected from the group consisting of oxides, hydroxides, hydrated oxides, sulfates, sulfites, sulfides, carbonates, carbides, nitrates, nitrites, nitrides, borates, silicates, phosphates, hydrides, phosphites and phosphonates.

14. The composition of claim 3 wherein E is selected from among the group consisting of oxides, phosphates and hydroxides.

15. The composition of claim 3 wherein E is at least one member selected from the group consisting of $TiO_2$, $SiO_2$, $SnO_2$, ZnO, ZnS, boehmite, $ZrO_2$, $Al_2O_3$, aluminum phosphates, iron oxides, TiN, WC, AlO(OH), $Sb_2O_3$, $NaSO_4$, vanadium oxides, zinc borate, aluminum silicates, magnesium silicates, one-, two-, and three-dimensional silicates and doped compounds thereof.

16. The composition of claim 3 wherein E is at least one member selected from the group consisting of hydrate-containing aluminum oxides and $TiO_2$.

17. The composition of claim 1 further containing at least one additive selected from the group consisting of lubricants, mold release agents, nucleating agents, antistatic agents, stabilizers, dyes and pigments.

18. The composition of claim 3 further containing a flame retardant that is different from component D.

19. A process for the preparation of the compositions of claim 3 comprising mixing A, B, C, D, and E and optionally further additives and melt-compounding.

20. A method of using the molding composition of claim 1 comprising producing a molded article.

21. A molded article comprising the composition of claim 1.

22. The composition of claim 2 wherein $R^1$ and $R^2$ stand independently of one another for halogen-substituted $C_1$–$C_{10}$-alkyl or halogen substituted $C_6$–$C_{10}$-aryl.

23. The composition of claim 2 wherein $R^3$ and $R^4$ stand independently of one another for halogen-substituted $C_1$–$C_{10}$-alkyl or for halogen-substituted C6–$C_{10}$-aryl.

24. The composition of claim 2 wherein B denotes halogen-substituted and/or $C_{1-4}$- alkyl substituted $C_6$–$C_{10}$-aryl.

* * * * *